United States Patent [19]

Ichiyoshi

[11] Patent Number: 4,905,221

[45] Date of Patent: Feb. 27, 1990

[54] EARTH STATION CAPABLE OF EFFECTIVELY USING A FREQUENCY BAND OF A SATELLITE

[75] Inventor: Osamu Ichiyoshi, Tokyo, Japan

[73] Assignee: NEC Corporation, Japan

[21] Appl. No.: 236,019

[22] Filed: Aug. 24, 1988

[30] Foreign Application Priority Data

Aug. 24, 1987 [JP] Japan .................... 62-209764
Sep. 4, 1987 [JP] Japan .................... 62-221587

[51] Int. Cl.[4] .......................... H04J 13/00; H04J 1/02
[52] U.S. Cl. ................................. 370/18; 370/69.1; 375/1
[58] Field of Search ............ 370/18, 19, 75, 69.1, 370/76; 375/1

[56] References Cited

U.S. PATENT DOCUMENTS

| | | | |
|---|---|---|---|
| 4,425,642 | 1/1984 | Moses et al. | 370/19 |
| 4,455,651 | 6/1984 | Baran | 370/18 |
| 4,672,605 | 6/1987 | Hustig et al. | 375/1 |
| 4,703,474 | 10/1987 | Foschini et al. | 370/18 |
| 4,811,357 | 3/1989 | Betts et al. | 375/1 |
| 4,821,120 | 4/1989 | Tomlinson | 358/142 |

OTHER PUBLICATIONS

"A Domestic Satellite Communication System" by van Iterson et al, Phillips Telecommunication Review, vol. 36, No. 2, Jun. 1978, pp. 116–132.

Primary Examiner—Douglas W. Olms
Attorney, Agent, or Firm—Ostrolenk, Faber, Gerb & Soffen

[57] ABSTRACT

For use in a satellite communication system which carries out communication through a satellite by the use of an up-link frequency band and a down-link frequency band, each of the up-link and the down-link frequency bands has a plurality of frequency subbands spaced apart from one another with frequency gap bands interposed between the frequency subbands. An earth station comprises a modulating arrangement (47) for modulating a selected one of the frequency subbands of the up-link frequency band by a first input signal into a subband transmission signal; a first transmitting arrangement (51) coupled to the modulating arrangement for transmitting the subband transmission signal through the selected one of the frequency subbands; a spread spectrum processing arrangement (50) for processing a second input signal into a spread spectrum transmission signal in the up-link frequency band; and a second transmitting arrangement (51) coupled to the spread spectrum processing arrangement for transmitting the spread spectrum transmission signal through the up-link frequency band.

7 Claims, 9 Drawing Sheets

EARTH STATION CAPABLE OF EFFECTIVELY USING A FREQUENCY BAND OF A SATELLITE

BACKGROUND OF THE INVENTION

This invention relates to an earth station for carrying out communication in a satellite communication system through a single satellite or a plurality of satellites.

In addition to a satellite or satellites, a satellite communication system comprises a base station and a fixed station. The earth station may be used as a selected one of the base station and the fixed station. Alternatively, a satellite communication system comprises a base station and a movable station. The earth station may be used as one of the base station and the movable station. The movable station is carried by an airplane or an automobile and has a variable location. As a further alternative, the satellite communication system comprises a base station, a fixed station, and a movable station. The earth station may be used as one of the base station, the fixed station, and the movable station.

When used as the movable station which has a small antenna of wide directivity, the earth station is herein called a small earth station. The small antenna has a wide directivity in order to cope with variation of the variable location of the earth station. The satellite communication system generally comprises a plurality of small earth stations. In addition to the satellite communication system, another satellite communication system may use the satellite or satellites and comprise another plurality of small earth stations. In this event, undesirable interference takes place between these satellite communication systems.

In order to avoid such interference, proposal is made about using a spread spectrum technique in U.S. Pat. No. 4,455,651 issued to Paul Barran et al and assigned to Equatorial Communications Company.

The spread spectrum technique is useful for a movable station in locating the variable location at which the station is present. This field of application of the spread spectrum technique is disclosed in U.S. Pat. No. 4,359,733 issued to K. O'Neill.

However, a wide frequency band is occupied when carrying out communication by the use of the spread spectrum technique. This makes it difficult to transmit other data signal through the frequency band and results in a reduction of efficiency of transmission.

In order to improve the efficiency of transmission, the frequency band is divided into a lower frequency band and a higher frequency band. The lower frequency band is employed for frequency division multiplexed signals. The higher band is employed for spread spectrum signals. Inasmuch as only the higher frequency band is used, the spread spectrum signals are unavoidably received with a reduced gain.

SUMMARY OF THE INVENTION

It is an object of this invention to provide an earth station for use in a satellite communication system that comprises at least one satellite assigned with a frequency band and is capable of effectively using a frequency band of a satellite.

It is another object of this invention to provide an earth station of the type described, that is capable of preventing interference between two satellite communication systems.

An earth station to which this invention is applicable is for carrying out communication in a satellite communication system through a satelllite by the use of an up-link frequency band and a down-link frequency band. The earth station comprises a transmission section responsive to first and second input signals for transmitting first and second transmission signals through the up-link frequency band towards the satellite. According to this invention, each of the up-link and the down-link frequency bands has a plurality of frequency subbands spaced apart from one another with frequency gap bands interposed between the frequency subbands. The transmission section comprises modulating means for modulating a selected one of the frequency subbands of the up-link frequency band by the first input signal into a transmission subband signal; first transmitting means coupled to the modulating means for transmitting the transmission subband signal as the first transmission signal through the selected one of the frequency subbands; spread spectrum processing means for processing the second input signal into a spread spectrum transmission signal in the up-link frequency band; and second transmitting means coupled to the spread spectrum processing means for transmitting the spread spectrum transmission signal as the second transmission signal through the up-link frequency band.

DESCRIPTION OF THE PREFERRED EMBODIMENT

Figure 1:
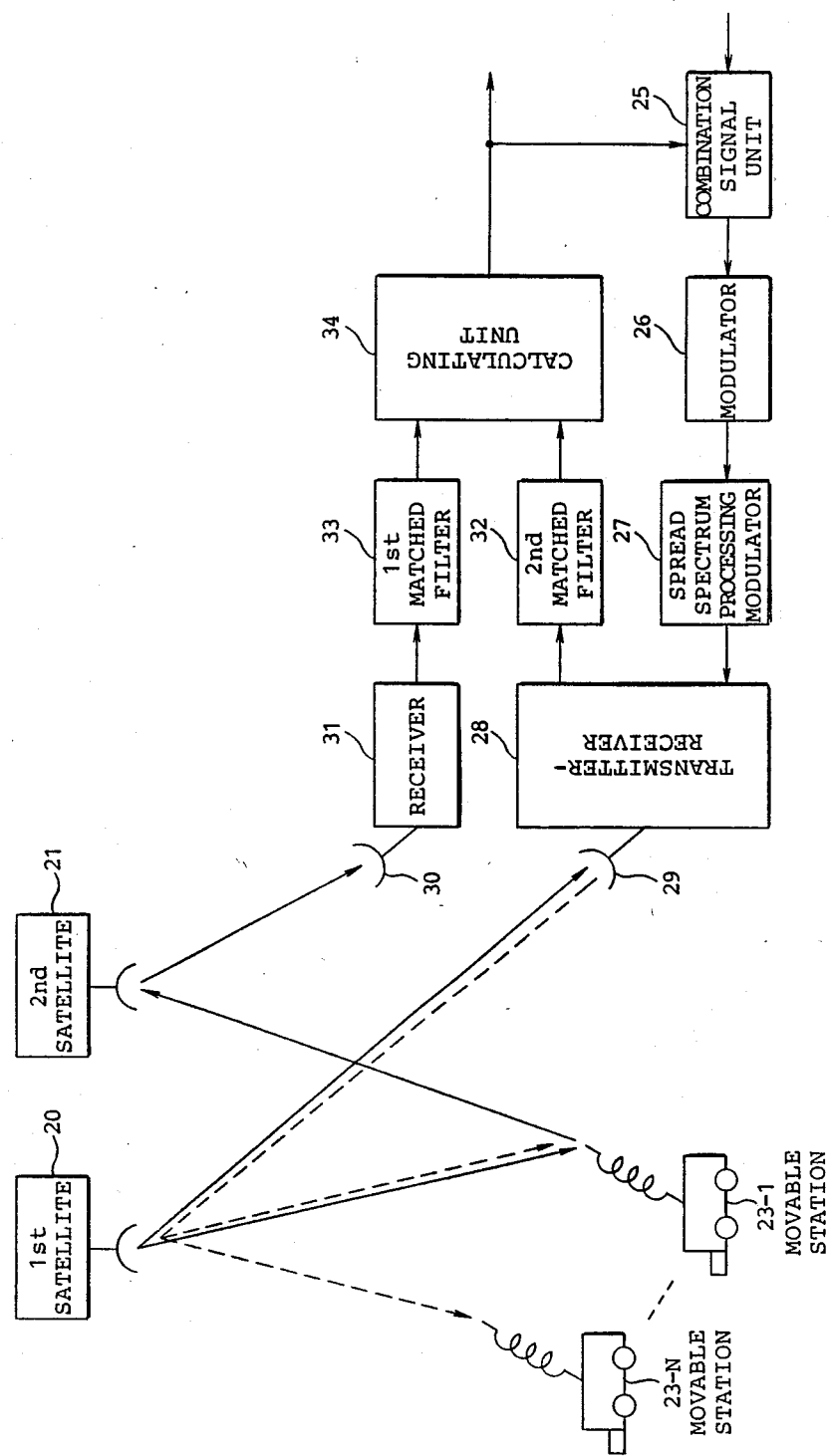
FIG. 1 schematically shows a conventional satellite communication system having a plurality of earth stations.

Referring to FIG. 1, a conventional satellite communication system will be described at first in order to facilitate an understanding of the present invention. The satellite communication system comprises a plurality of satellites and a plurality of earth stations. In the example being illustrated, only two satellites are exemplified as first and second satellites 20 and 21. A plurality of movable stations 23-1 through 23-N and a single base station 24 are illustrated as the earth stations.

In the manner known in the art, the first and second satellites 20 and 21 are on the geostationary orbit. The first satellite 20 is displaced from the second satellite 21 on the geostationary orbit. The base station 24 can communicate with the movable stations 23-1 through 23-N through the first and the second satellites 20 and 21.

In the base station 24, a signal combination circuit 25 is supplied with a frame synchronization signal of a predetermined bit pattern and a sequence of message signals. The frame synchronization signal and the message signals are supplied from an external device (not shown). The signal combination circuit 25 positions the frame synchronization signal at the head of each frame and the message signal following the frame synchronization signal to produce a combination signal.

The combination signal is subjected to phase shift keying (PSK) by a modulator 26 to be produced as a PSK signal. The PSK signal is sent to a spread spectrum processing modulator 27. The spread spectrum processing modulator 27 carries out forward spread spectrum processing of the PSK signal by a predetermined pseudo noise code signal (PN signal) to produce a code division multiplexed (CDM) spread spectrum signal. The CDM spread spectrum signal will be called a CDM signal hereinafter. When such CDM signals should be directed to some or all of the movable stations 23-1 through 23-N, different PN signals are used. The CDM signals are different from one another depending on the PN signals.

The CDM signal is delivered to a transmitter-receiver 28 as a transmitted CDM signal and is transmitted from the transmitter-receiver 28 through a sharp directivity antenna 29 to the first satellite 20 by the use of an up-link frequency band.

The transmitted CDM signal is repeated by the first satellite 20 as a repeated CDM signal. Each of the movable stations 23-1 through 23-N receives the repeated CDM signal through a down-link frequency band as a received CDM signal.

When the CDM signal is transmitted at a transmission rate within a bandwidth of $\Delta f$ (Hz), the frame has a frame period $1/\Delta f$. Each of the up-link frequency band and the down-link frequency band must have a bandwidth of $N\Delta f$ (Hz), where N represents the spectrum spread parameter as called in the art.

The received CDM signal is received at each of the movable stations 23-1 through 23-N by a low or wide directivity antenna. One of the movable stations 23-1 through 23-N is assigned with a particular PN signal. When the received CDM signal is identified by the particular PN signal, that movable station carries out inverse spread spectrum processing of the received CDM signal to reproduce the PN signal and the PSK signal. The PSK signal is demodulated into a reproduced combination signal. The movable station under consideration derives or extracts the message signal from the combination signal.

It will now be assumed that it is desired by the movable station 23-1 to carry out a position or location to locate its position or location. The position or location is determined after the PN signal is reproduced as a reproduced PN signal. In this event, the movable station 23-1 carries out forward spread spectrum processing of a positioning message signal into a locating CDM signal by the particular PN signal which is synchronized with the reproduced PN signal.

Through the up-link frequency bands, the locating CDM signal is transmitted to the first and the second satellites 20 and 21 as first and second transmission signals, respectively. The first transmission signal is repeated by the first satellite 20 and is received by the transmitter-receiver 28 as a first reception signal. Likewise, the second transmission signal is received as a second reception signal by a receiver 31 through a reception antenna 30. First and second matched filters 32 and 33 are for carrying out inverse spread spectrum processing of the first and the second reception signals, respectively.

Figure 2:
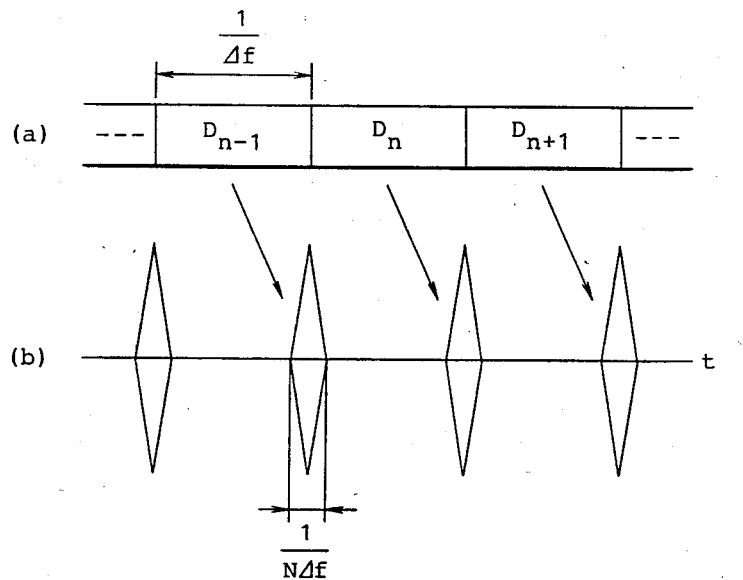
FIG. 2 shows a process carried out on a reception signal in one of the earth stations.

Turning to FIG. 2, each of the first and the second reception signals has frames $D_{n-1}$, $D_n$, and $D_{n+1}$ in the manner depicted along an upper line labelled (a). Each frame has the frame period $1/\Delta f$. As shown along a lower line indicated at (b), each of the matched filters 32 and 33 produces a sequence of pulse signals located at the heads of the respective frames. Each pulse signal has a time duration $1/(N\Delta f)$, respectively.

Turning back to FIG. 1, the pulse signals are delivered to a calculating unit 34. Based on the pulse signal sequence supplied from the first matched filter 32, the calculating unit 34 detects a first time instant of arrival of the first reception signal from the first satellite 20. Similarly, the calculating unit 34 detects a second time instant of arrival of the second reception signal from the second satellite 21 by using the pulse signal sequence produced by the second matched filter 33. Based on the first and the second time instants, the calculating unit 34 calculates the position of the movable station 23-1 by the use of triangulation in the manner known in the art. This position data is transmitted to the movable station 23-1 through the first satellite 20 as described above.

The locating CDM signal is transmitted by using a wide frequency bandwidth $N\Delta f$ of each of the first satellites 20 and 21. Therefore, it is possible to determine the position with a high degree of accuracy.

However, the wide frequency band is occupied by the locating CDM signal. This makes it difficult to transmit other CDM signals through the frequency bandwidth and results in a reduction of efficiency of transmission.

Figure 3:
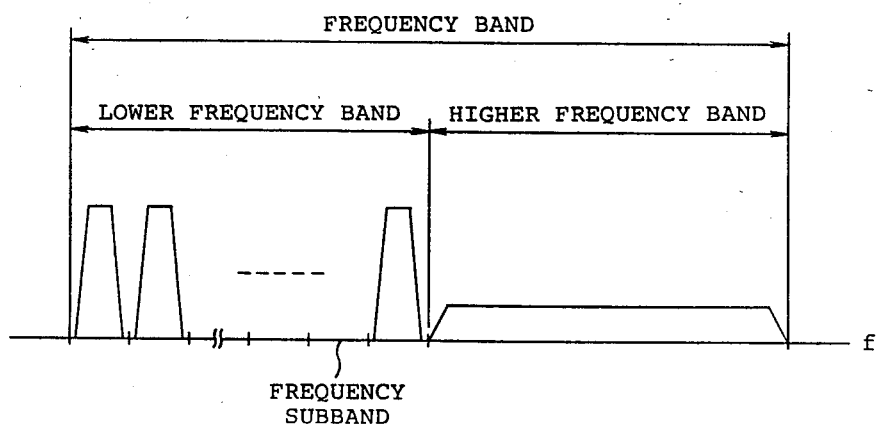
FIG. 3 diagrammatically shows division of a frequency band for use in another conventional satellite communication system.

Referring to FIG. 3, the frequency band is divided into a lower frequency band and a higher frequency band. The lower frequency band is used in transmitting frequency division multiplexed signals. Only the higher frequency band is used in transmitting the CDM signals.

The lower frequency band has a plurality of frequency subbands adjacent to one another. The frequency division multiplexed signal consists of data signals transmitted through the respective frequency subbands. The frequency subbands are called first frequency channels of frequency slots. Each spread spectrum signal is a CDM signal and carries the message signals subjected to spread spectrum processing.

Inasmuch as only the higher frequency band is used, the spread spectrum signals are unavoidably received with a reduced gain.

Figure 4:
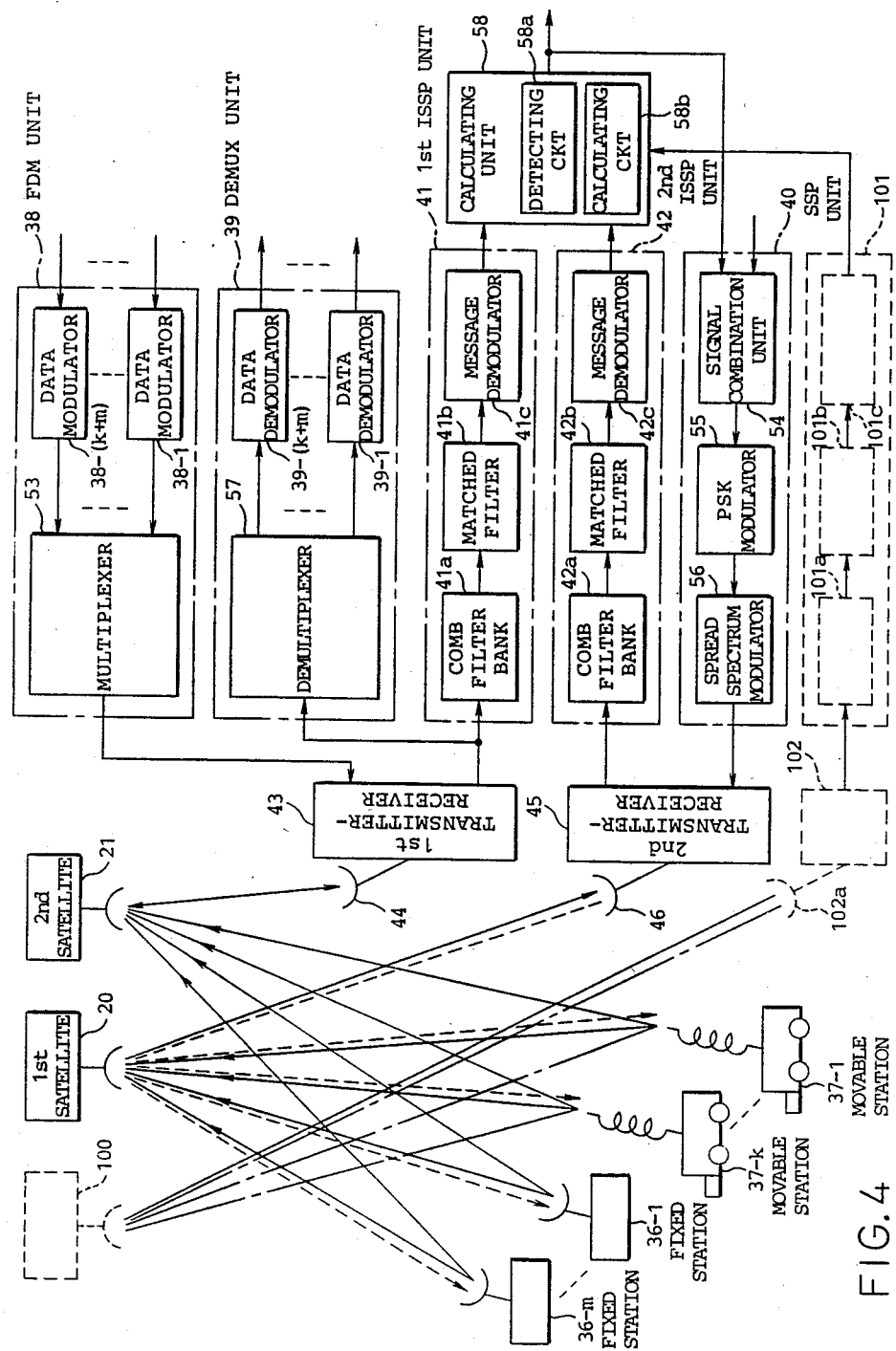
FIG. 4 schematically shows a satellite communication system which comprises a plurality of earth stations according to a first embodiment of this invention.

Referring to FIG. 4, a satellite communication system comprises a single base station 35, first through m-th fixed stations 36-1 to 36-m, and first through k-th movable or mobile stations 37-1 to 37-k. Each of the movable stations 37-1 to 37-k may be carried by a vehicle, such as an automobile or an airplane. Each of the base station 35 and the movable stations 37 (suffixes omitted) is according to a first embodiment of this invention as will become clear as the description proceeds. The satellite communication system may comprise a plurality of base stations which cooperate with the fixed stations. At any rate, the illustrated base station 35, the fixed stations 36-1 to 36-m, and the movable stations 37-1 to 37-k are communicable with one another through the first and second satellites 20 and 21 which are assumed to be geostationarily located at different positions of a geostationary orbit. However, it is to be noted that the first and the second satellites 20 and 21 may not always be geostationary satellites but orbiting satellites which run along different orbits.

In the example being illustrated, the base station 35 bidirectionally communicates with the fixed stations 36-1 to 36-m and the movable stations 37-1 to 37-k not only through the first satellite 20 but also through the second satellite 21. For this purpose, up-link and down-link frequency bands are determined between the base station 35 and the movable stations 37-1 to 37-k and between the base station 35 and the fixed stations 36-1 to 36-m and may be common to the first and the second satellites 20 and 21.

Figure 5:
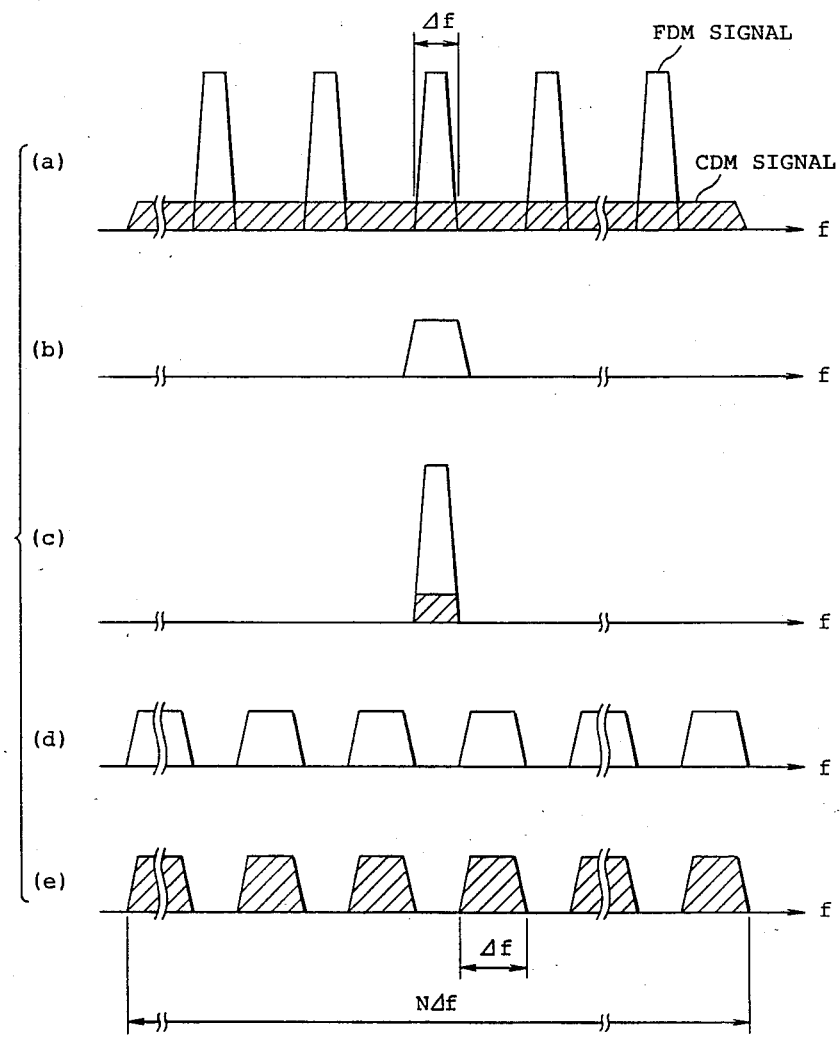
FIG. 5 shows a process carried out on a reception signal in one of the earth stations illustrated in FIG. 4.

Turning to FIG. 5 for a short while, each of the up-link and the down-link frequency bands comprises a plurality of frequency subbands or channels spaced apart from one another along a frequency axis with a frequency gap or slots interposed between the frequency subbands, as shown along a top line labelled (a). Each frequency subband is called a first frequency channel. Likewise, each frequency gap is called a second frequency channel.

In FIG. 4, the base station 35 comprises a frequency division multiplexing (FDM) unit 38 for carrying out frequency division multiplexing of a plurality of data signals such as sound signals to produce an FDM signal. A demultiplexing (DEMUX) unit 39 is for demultiplexing a reception FDM signal to reproduce a plurality of data signals. A spread spectrum processing (SSP) unit 40 carries out forward spread spectrum processing of a message signal to produce a CDM signal. First and second inverse spread spectrum processing (first and second ISSP) units 41 and 42 are for carrying out inverse spread spectrum processing on first and second reception CDM signals to reproduce message signals, respectively.

The FDM unit 38, the demultiplexing unit 39, and the first inverse spread spectrum processing unit 41 are connected to a first transmitter-receiver 43 connected to a first sharp directivity antenna 44 directed to the second satellite 21. The second inverse spread spectrum processing unit 42 and the spread spectrum processing unit 40 are connected to a second transmitter-receiver 45 accompanied by a second sharp directivity antenna 46 directed to the first satellite 20.

Figure 6:
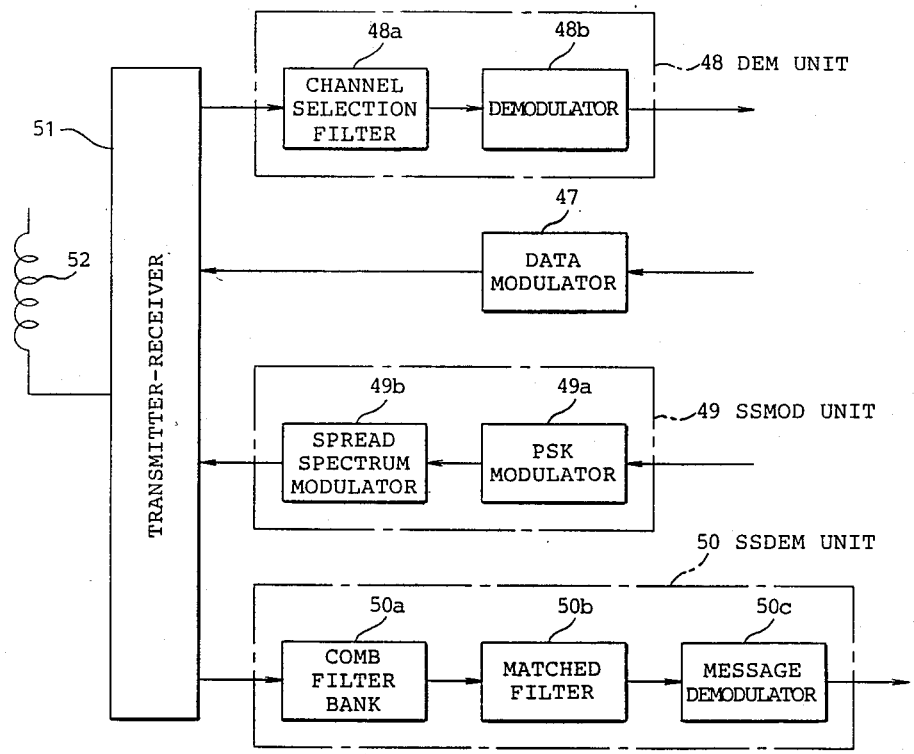
FIG. 6 shows a block diagram of a movable station used as one of the earth stations depicted in FIG. 4.

Referring to FIG. 6, the first movable station 37-1 comprises a data modulator 47, a demodulation (DEM) unit 48, a spread spectrum modulation (SS MOD) unit 49, and a spread spectrum demodulation (SS DEM) unit 50. A transmitter-receiver 51 is coupled to a low or wide directivity antenna 52 and is connected to the data modulator 47, the demodulation unit 48, the spread spectrum modulation unit 49, and the spread spectrum demodulation unit 50.

The data modulator 47 modulates a predetermined subcarrier assigned to the movable station 37-1 by a transmitting data signal to produce a modulated signal. The predetermined subcarrier is one of the first frequency channels that is assigned to the first movable station 37-1. In this manner, the data modulator 47 modulates the predetermined subcarrier by the transmitting data signal and serves as a modulating arrangement for modulating a selected one of the frequency subbands or the first frequency channels into a transmission subband signal by the transmitting data signal which serves as a first input signal.

A message signal has a predetermined code sequence assigned to the first movable station 37-1 as a second input signal and is delivered to the spread spectrum modulation unit 49. In the manner which will later be described in detail, the spread spectrum modulation unit 49 carries out spread spectrum processing of the message signal to provide a CDM (code division multiplexed) signal as a spread spectrum transmission signal having the up-link frequency band. Production of a CDM signal is possible by the use of a spread spectrum technique which is described in a book "Spread Spectrum Systems" written by R. C. Dixon and published 1976 by John-Wiley and Sons, Inc. The spread spectrum technique will therefore not be described in detail.

The transmission subband signal and the CDM signal are delivered to the transmitter-receiver 51. The transmitter-receiver 51 transmits the transmission subband signal through the predetermined subband as a first transmission signal. The transmitter-receiver 51 serves as a first transmitting arrangement for transmitting the transmission subband signal. The transmitter-receiver 51 transmits the CDM signal through the up-link frequency band as a second transmission signal. The transmitter-receiver 51 serves as a second transmitting arrangement for transmitting the CDM signal. The first and the second transmission signals are collectively called a transmission signal hereinabove.

In a like manner, the base station 35 (FIG. 4) transmits a transmission subband signal and a spread spectrum transmission signal. A combination of the transmission subband signal and the spread spectrum transmission signal is termed a transmitted signal when transmitted from the base station 35.

Through the second satellite 21, the first movable station 37-1 receives, as a first reception signal, the transmission subband signal transmitted from the base station 35 through one of the frequency subbands that is assigned in the down-link frequency band to the movable station 37-1 as a predetermined one of the frequency subbands. Furthermore, the movable station 37-1 receives, as a second reception signal, the spread spectrum transmission signal which is transmitted from the base station 35 through the up-link frequency band and is repeated by the first satellite 20 through the down-link frequency band. Responsive to the first and the second reception signals, the transmitter-receiver 51 produces first and second reception band signals.

The demodulation unit 48 produces a reception subband signal from the first reception band signal and demodulates the reception subband signal into a data signal. The spread spectrum demodulation unit 50 produces a frequency gap signal from the second reception band signal and carries out inverse spread spectrum processing on the frequency gap signal to produce a message signal.

More particularly, the demodulation unit 48 comprises a channel selection filter 48a for selecting the reception subband signal from the first reception band signal. A data demodulator 48b demodulates the reception subband signal into the data signal. The channel selection filter 48a serves as a first receiving arrangement. The data demodulator 48b serves as a first producing arrangement.

The spread spectrum demodulation unit 50 comprises a comb filter bank 50a for selecting the frequency gap signal from the second reception band signal. A matched filter 50b carries out inverse spread spectrum processing of the frequency gap signal to produce a frequency matches signal. A message demodulator 50c demodulates the frequency matched signal into the data signal. The comb filter bank 50a serves as a second receiving arrangement. The matched filter 50b and the message demodulator 50c serves as a second producing arrangement.

The other movable stations 37-2 to 37-k are similar in structure and operation to the movable station 37-1 and will not be described any longer.

Referring to FIGS. 4 and 6 together with FIG. 5, each of the first frequency channels or the frequency subbands and the second frequency channels or the frequency gaps has a prescribed bandwidth $\Delta f$. The first frequency channels are assigned to the fixed stations 36-1 and 36-m and the movable stations 37-1 to 37-k, respectively.

In case where the base station 35 communicates with the fixed stations 36-1 to 36-m and the movable stations 37-1 to 37-k by sending data signals, the base station 35 communicates with the fixed stations 36-1 to 36-m and the movable stations 37-1 to 37-k by using the first frequency channels corresponding to the fixed stations 36-1 to 36-m and the movable stations 37-1 to 37-k, respectively.

The FDM unit 38 comprises the first through (k+m)-th data modulators 38-1 to 38-(k+m) corresponding to the fixed stations 36-1 to 36-m and the movable stations 37-1 to 37-k, respectively. The data modulators 38-1 to 38-(k+m) modulate subcarriers different from each other by the data signals to produce a plurality of modulated signals, respectively.

A multiplexer 53 carries out FDM of the modulated signals to produce an FDM signal. The FDM signal is transmitted to the second satellite 21 through the first frequency channels of the up-link frequency band by the first transmitter-receiver 43.

On the other hand, te second transmitter-receiver 45 transmits a sequence of standard bursts as a CDM signal by using the up-link frequency band to the first satellite 20. The standard bursts are in a predetermined period.

A signal combination unit 54 combines a frame synchronization signal with the standard burst sequence into a sequence of message signals to produce a sequence of combined signals. A PSK modulator 55 modulates the combined signals according to PSK to produce a modulation signal. A spread spectrum modulator 56 carries out forward spread spectrum processing of the modulation signal to produce a CDM signal. The CDM signal is transmitted to the first satellite 20 through the up-link frequency band by the second transmitter-receiver 45.

Each of the data modulators 38-1 to 38-(k+m) serves as the modulating arrangement for modulating a selected one of the frequency subbands into a transmission subband signal by the data signal which serves as a first input signal. The spread spectrum processing unit 40 carries out spread spectrum processing of the message signal sequence to produce a CDM signal as a spread spectrum signal having the up-link frequency band in the manner described above. The first transmitter-receiver 43 serves as the first transmitting arrangement described above, and the second transmitter-receiver 45, as a second transmission signal.

Although not shown, each of the fixed stations 36-1 to 36-m comprises a data modulator, a demodulation unit, and a transmitter receiver similar in structure and operation to the modulator 47, the demodulation unit 48, and the transmitter-receiver 51 described in conjunction with FIG. 6. The data modulator and the demodulation unit are connected directly to the transmitter-receiver which is coupled, in turn, to an antenna directed to the second satellite 21 alone like the first sharp directivity antenna 44.

The fixed stations 36-1 and 36-m and the movable stations 37-1 to 37-k are supplied with the FDM reception signal and CDM reception signal as first and second reception signals, respectively. In the manner depicted in FIG. 5 along the top line (a), the first reception signal has a first partial spectrum of FDM reception signal assigned to the first frequency channels. The second reception signal has a second partial spectrum of CDM reception signal assigned to both of the first and the second frequency channels. The first and the second partial spectra are collectively called a reception spectrum.

In FIG. 6, the transmitter-receiver 51 receives the FDM reception signal and the second reception signal as first and second reception signals, respectively. It is assumed that the channel selection filter 48a has a bandpass characteristic for allowing an i-th frequency subband to pass therethrough, as shown in FIG. 5(b). As a result, the channel selection filter 48a supplies the demodulator 48b with a modulated signal assigned to the i-th frequency subband as shown in FIG. 5(c). The modulated signal is demodulated by the demodulator 48b into a data signal, such as a sound signal.

On the other hand, the comb filter bank 50a has a filter characteristic, so as to allow the second frequency channels to pass therethrough as shown in FIG. 5(d). Consequently, the comb filter bank 50a separates the CDM signal from the FDM signal. The CDM signal is spread over a frequency bandwidth $N\Delta f$ and is divided into a plurality of partial spectrum signals each of which has a frequency bandwidth of $\Delta f$ and which is spaced apart from one another as shown in FIG. 5(e). The CDM signal is supplied through the matched filter 50b to the message demodulator 50c to be demodulated into a demodulated PSK signal (or a message signal) and a demodulated PN signal.

In case where the movable station 37-1 communicates with the base station 35 by sending a data signal, the modulated signal is transmitted from the modulator 47 to the second satellite 21 through the first frequency channel assigned to the movable station 37-1 of the up-link frequency band as the first transmission signal. In the base station 35 (FIG. 4), the reception signal from the second satellite 21 is received by the first transmitter-receiver 43 through the first antenna 44 and is supplied to a demultiplexer 57. In the example being illustrated, the demultiplexer 57 supplies the reception signal as the modulated signal to a selected one of first through (k+m)-th data demodulators 39-1 to 39-(k+m), for example, the data demodulator 39-1. The data demodulator 39-1 demodulates the modulated signal to produce the data signal.

On locating the movable station 37-1, a position signal is sent as the message signal to a PSK modulator 49a to be subjected to PSK and to be produced as a PSK signal. The PSK signal is supplied to a spread spectrum modulator 49b. The spread spectrum modulator 49b carries out forward spread spectrum processing of the PSk signal by using the own PN signal in synchronism with the demodulated PN signal to produce a CDM signal. The CDM signal is transmitted to the first and second satellites 20 and 21 by using the first and second frequency channels of up-link frequency bands.

In FIG. 4, the reception CDM signals from the first and second satellites 20 and 21 are received by the first and the second transmitter-receivers 43 and 46 through the first and the second antennae 44 and 46 to be supplied to comb filter banks 41a and 42a, respectively. The comb filter banks 41a and 42a pass only the second frequency channels, respectively. The reception CDM signals are subjected to inverse spread spectrum processing by matched filters 41b and 42b and are delivered to the message demodulators 41C and 42c to be demodulated into first and second positioning message signals.

The first and second positioning message signals are supplied to the calculation unit 58. The calculation unit 58 comprises a detecting circuit 58a and a calculating circuit 58b. The detecting circuit 58a detects a first arrival time instant and a second arrival time instant based on the first and the second positioning message signals, respectively. The calculating circuit 58b calculates the position of the movable station 37-1 in question by the use of triangulation with reference to the first arrival time instant and the second arrival time instant. The position signal is transmitted to the movable station 37-1 by using forward spread spectrum processing.

Now, description will be made about inverse spread spectrum processing of the reception CDM signal carried out in the base station 35 in detail.

When the reception CDM signal is assumed to be represented as S(t) in a time base, namely, as a function of time t, the reception CDM signal may be represented as S(ω) in a frequency base, namely, as a function of frequency. A relationship between S(t) and S(ω) is given by:

$$S(\omega) = \int S(t) e^{-j\omega t} dt.$$

Let each of the comb filter banks 41a and 42a have a frequency response characteristic F(ω) represented by:

$$F(\omega) = \sum_n a_n \cos\left(\frac{n\omega}{\Delta f}\right), \quad (2)$$

where $\{a_n\}$ is representative of a Fourier coefficient.

From Equations (1) and (2), it is seen that each output signal $\hat{S}(t)$ from comb filter banks 41a and 42a is represented by:

$$\hat{S}(t) = \frac{1}{2\pi} \int S(\omega) \cdot F(\omega) e^{-j\omega t} d\omega \quad (3)$$

$$= S(t) + \tfrac{1}{2} \Sigma a_n \left\{ S\left(t - \frac{n}{\Delta f}\right) + S\left(t + \frac{n}{\Delta f}\right) \right\}.$$

Figure 7:
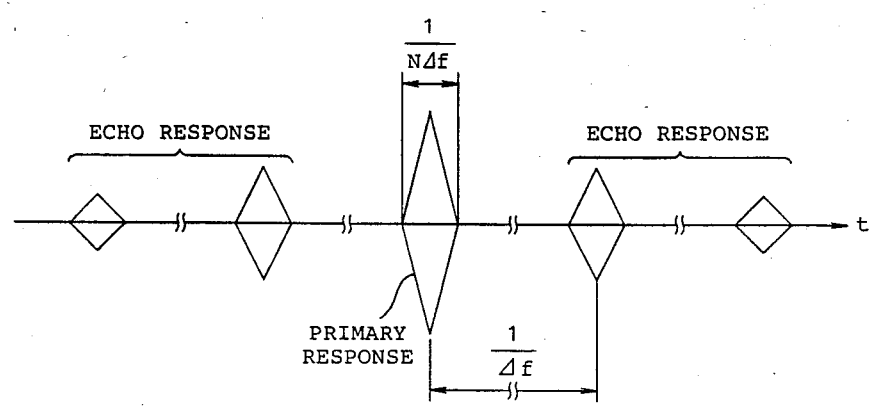
FIG. 7 shows a view of a response of a matched filter used in one of the earth stations illustrated in FIG. 4.

In Equation (3), first and second terms on the righthand side represent a primary response and a subsidiary or echo response. As illustrated in FIG. 7, the echo response accompanies forward and rearward the primary response at every time instant of n/Δf, where n represents a natural number.

Each of the primary response and the echo response is restricted to a pulse width of 1/(NΔf) in FIG. 7. This shows that the pulse width is in inverse proportion to each frequency width of the up-link frequency band and the down-link frequency band.

From this fact, it is readily understood that each output signal from the comb filter banks 41a and 42a appears at a frequency interval of 1/Δf, due to the above-mentioned primary response and echo response. If the frequency interval Δf is equal to the transmission rate R of the reception CDM signal, the echo response adversely effects the primary response among the codes of the reception CDM signal. As a result, interference takes place among the codes of reception CDM signal.

In order to avoid the above-mentioned effect, Inequality (4) must hold.

$$\left| \frac{1}{R} - \frac{1}{\Delta f} \right| < \frac{1}{N \cdot \Delta f} \quad (4)$$

Inequality is rewritten into:

$$\frac{\Delta f}{R} < 1 - \frac{1}{N} \quad (5)$$

$$\frac{\Delta f}{R} > 1 + \frac{1}{N} \quad (6)$$

When the spread spectrum parameter N is considerably large, the transmission rate R may be selected so as to become larger than the bandwidth Δf of the second frequency channel as understood by Equation (5). The transmission rate R may be selected so as to become larger than the bandwidth Δf of the second frequency channel as understood by Equation (6). As a result, it is possible to avoid the interference among the codes due to the echo pulse.

Figure 8:
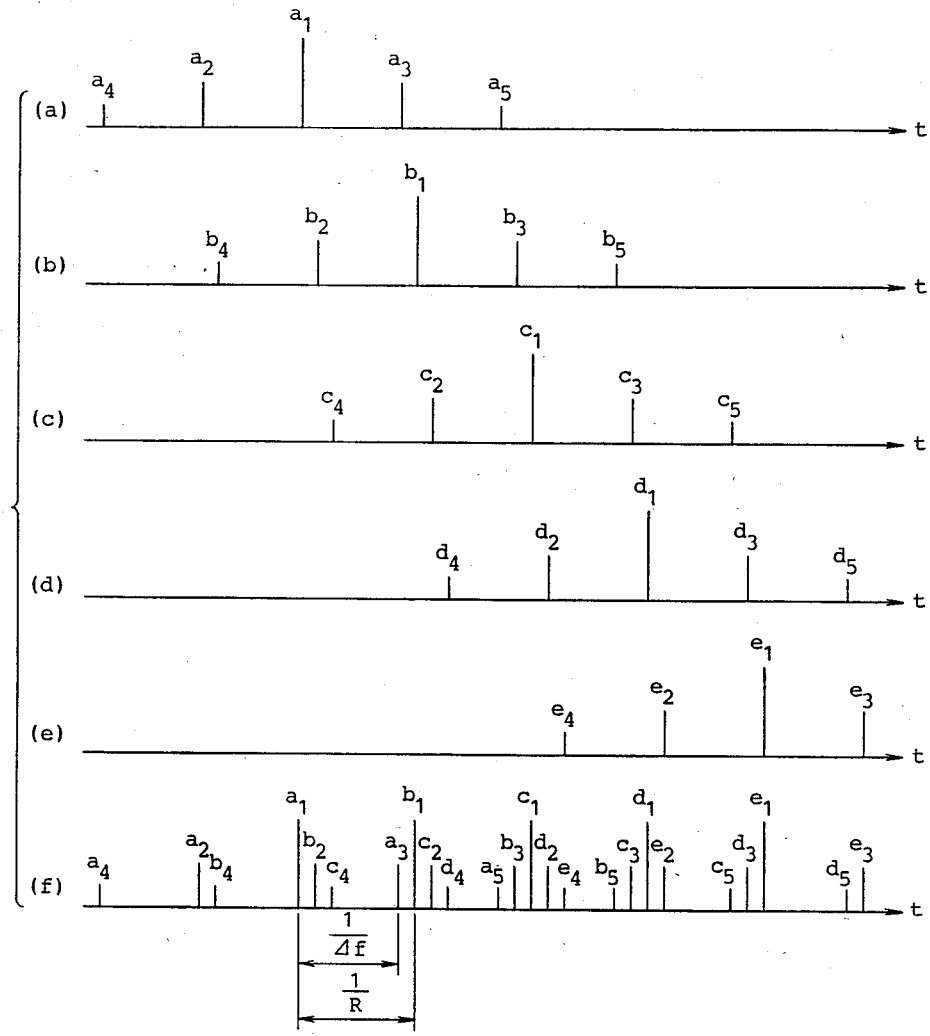
FIG. 8 shows an example of processing CDM spread spectrum signals in one of the earth stations illustrated in FIG. 4.

Referring to FIG. 8, the reception CDM signal is produced in the form of a sequence of codes depicted at $a_1$ to $a_5$ through $e_1$ to $e_4$ along first through fifth lines of FIG. 8, respectively, and may be made to correspond to the output signal of the comb filter bank. The comb filter bank produces, as the output signal, a primary pulse $a_1$ resulting from the primary response. The remaining pulses $a_2$ through $a_5$ are produced from the echo response. Likewise, primary pulses $b_1$ through $e_1$ appear as a result of the primary response while the remaining pulses $b_2$ to $b_5$; $c_2$ to $c_5$; $d_2$ to $d_5$; and $e_2$ to $e_4$ appear as results of the echo response.

As illustrated along the first line of FIG. 8, the primary pulse $a_1$ and the echo pulses $a_2$ through $a_5$ are arranged at the interval of 1/Δf one another. Similarly, the primary pulses $b_1$ to $e_1$ and the echo pulses $b_2$ to $b_5$ through $e_2$ to $e_4$ are arranged at the interval 1/Δf, respectively.

When the transmission rate R is smaller than the frequency bandwidth Δf, the matched filter produces a code sequence arranged as shown along a bottom line of FIG. 8(f).

Figure 9:
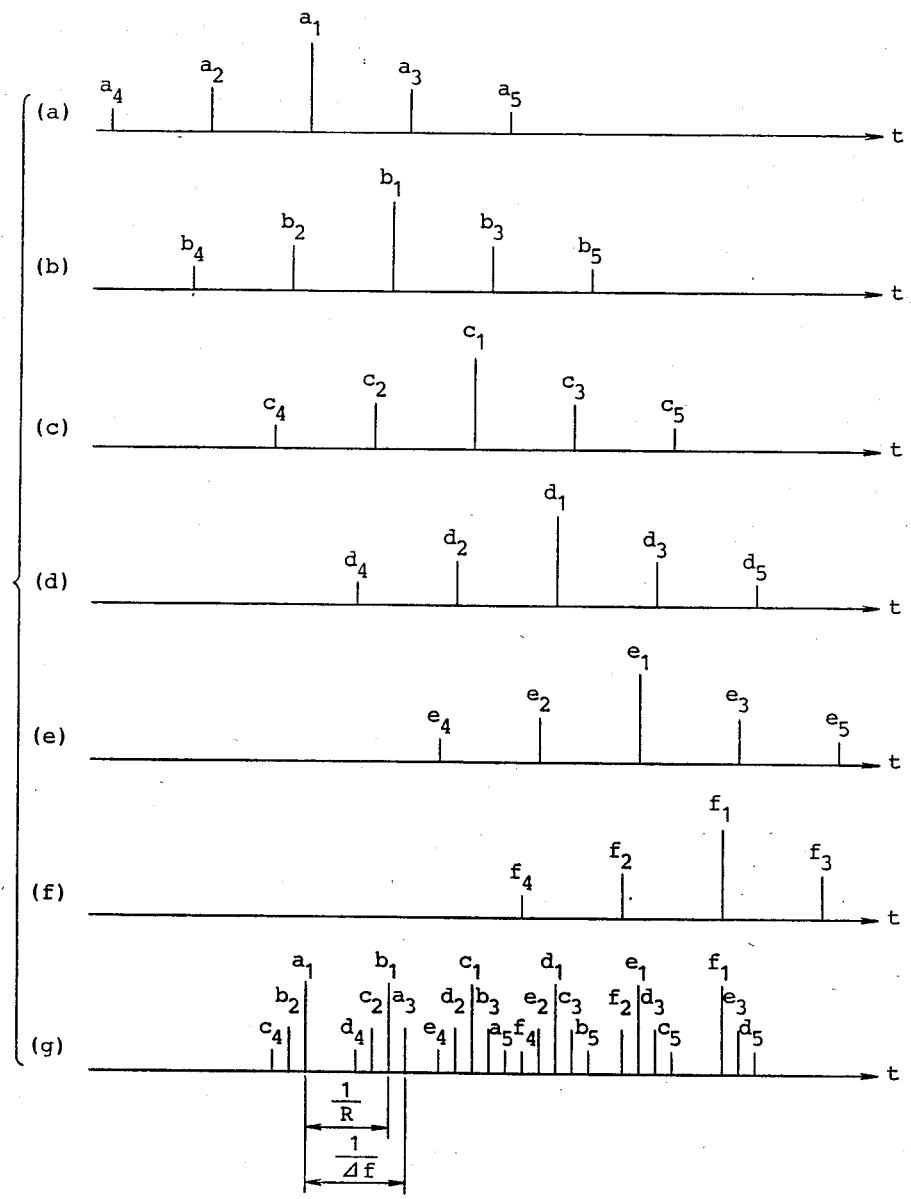
FIG. 9 shows another example of processing CDM spread spectrum signals in one of the earth stations illustrated in FIG. 4.

Referring to FIG. 9, the reception CDM signal is produced in the form of a sequence of codes $a_1$ to $a_5$ through $f_1$ to $f_4$ when the transmission rate R is greater than the frequency bandwidth Δf. In this event, the matched filter produces an output signal as shown in FIG. 9(g).

Thus, the primary pulses and the echo pulses can be separated from each other and interference is therefore avoidable due to the primary and the echo responses.

Now, description will be made about the message demodulator in the base station.

Figure 10:
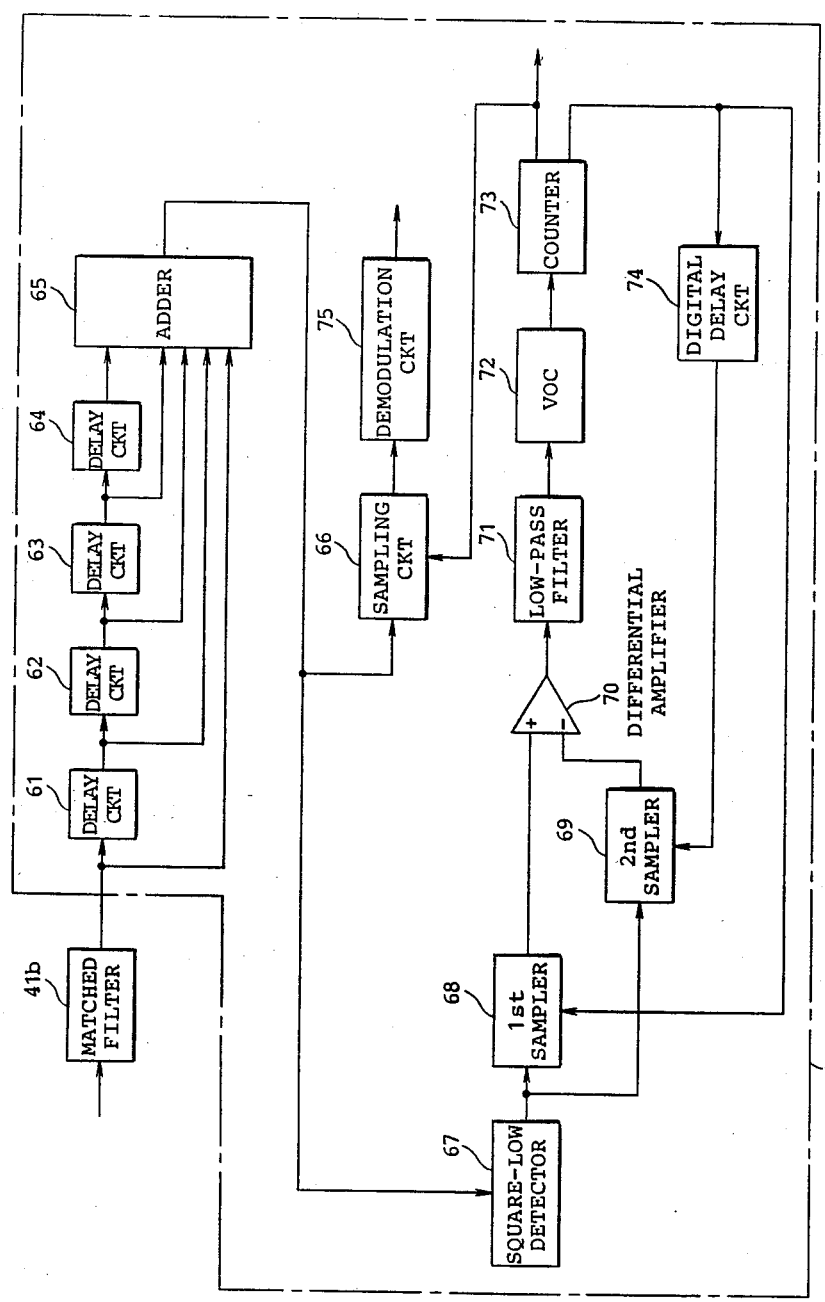
FIG. 10 shows a block diagram of a demodulation unit used in one of earth stations illustrated in FIG. 4.

Referring to FIG. 10, the matched filter 41b supplies a delay circuit 61 and an adder 65 with an output signal as shown along the bottom line of FIG. 8. The delay circuit 61 produces a first delay signal delayed by a delay time $1/\Delta f$ relative to the output signal. The first delay signal is successively delayed by delay circuits 62 to 64 and thereafter sent to the adder 65. The delay circuits 62 to 64 produce second through fourth delay signals delayed by two, three, and four times the delay time $1/\Delta f$ relative to the output signal, respectively.

The adder 65 adds the output signal to the first through the fourth delay signals to produce a sum signal. In the sum signal, the echo pulses $a_2$ through $a_5$ are added to the primary pulse $a_1$. Likewise, the echo pulses $b_2$ through $b_5$, $c_2$ through $c_5$, $d_2$ through $d_5$, and $e_2$ through $e_5$ are added to the primary response pulses $b_1$, $c_1$, $d_1$, and $e_1$, respectively.

The sum signal is supplied to a sampling circuit 66 and a square-law detector 56.

The square-law detector 67 calculates a square of the sum signal to produce a square signal and supplies the square signal to first and second samplers 68 and 69. The samplers 68 and 69 send first and second sampled signals to a differential amplifier 70 to produce an amplified signal. The amplified signal is supplied to a voltage-controlled oscillator (VCO) 72 through a low-pass filter 71. The VCO 72 delivers a controlled signal to a counter 73 and a digital delay circuit 74.

The counter 73 outputs a clock signal based on the output signal from the VCO 72. The clock signal is supplied to the digital delay circuit 74 and the sampler 66. The digital delay circuit 74 delays the clock signal with reference to the controlled signal given from the VCO 72 to produce a delayed clock signal delayed to the clock signal.

Figure 11:
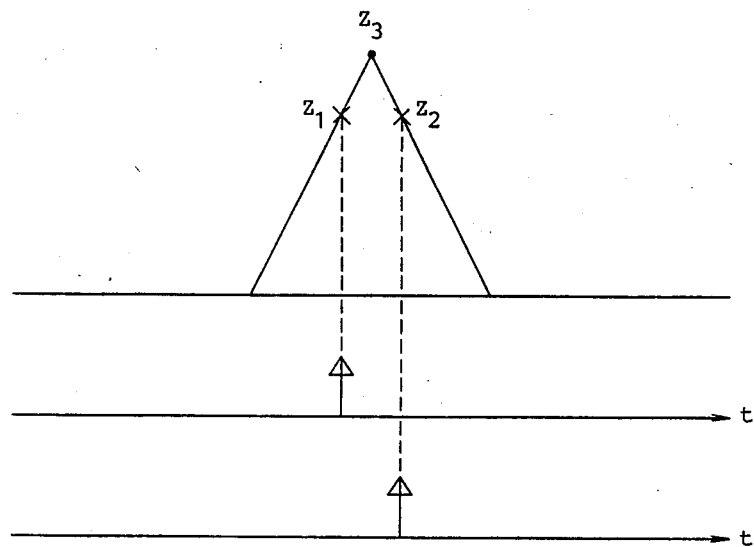
FIG. 11 shows a view for use in describing operation of the demodulation unit illustrated in FIG. 10.

Referring to FIG. 10 together with FIG. 11, the clock signal and the delayed clock signal are supplied to the samplers 68 and 69, respectively, so that the samplers 68 and 69 sample the detected signal at sampling points $Z_1$ and $Z_2$ to produce a first sampled signal and a second sampled signal, respectively. When the amplitude of the first sampled signal is equal to the amplitude of the second sampled signal, the output signal from the differential amplifier 70 becomes zero. As a result, the counter 73 generates a third clock signal in the point corresponding to a sampling point $Z_3$. The third clock signal is supplied to the sampling circuit 66 so that the sampling circuit 66 samples the sum signal at the peak level of the sum signal to produce a third sampled signal. The third sampled signal is supplied to a demodulation circuit 75. The demodulation circuit 75 demodulates the third sampled signal to reproduce the message signal. The message signal is supplied to the calculation unit 58.

The message demodulator 49c is similar in structure and operation to the message demodulator 48c.

Each of the message demodulators in the movable stations is similar in structure and operation to the message demodulator in the base station.

In addition, the message demodulator may have a plurality of delay circuits. For example, the message demodulator has the delay circuits 61 and 62. The adder 65 adds the output signal from the matched filter, the first delay signal, and the second delay signal to produce a sum signal.

In order to determine the position of the movable station, a satellite 100 may be used together with the satellites 20 and 21. In this case, the base station 35 may further comprise a third inverse spread spectrum processing (third ISSP) unit 101. The third inverse spread spectrum processing unit 101 comprises a comb filter bank 101a, a matched filter 101b, and a message demodulator 101c. A receiver 102 is connected to the comb filter bank 101a and has a third sharp directivity antenna 102a directed to the satellite 100. The message demodulator 101c is connected to the calculation unit 58 as shown in broken line in FIG. 4.

Under the circumstances, the movable station can transmit a position message signal to the satellites 20, 21, and 100 without receiving the time standard signal. The calculation unit 58 detects a third arrival time instant of the reception signal from the satellite 100 in response to the positioning message signal given from the message demodulator 101c. The calculation unit 58 calculates the position of the movable station based on the first, second, and third arrival time instants.

Figure 12:
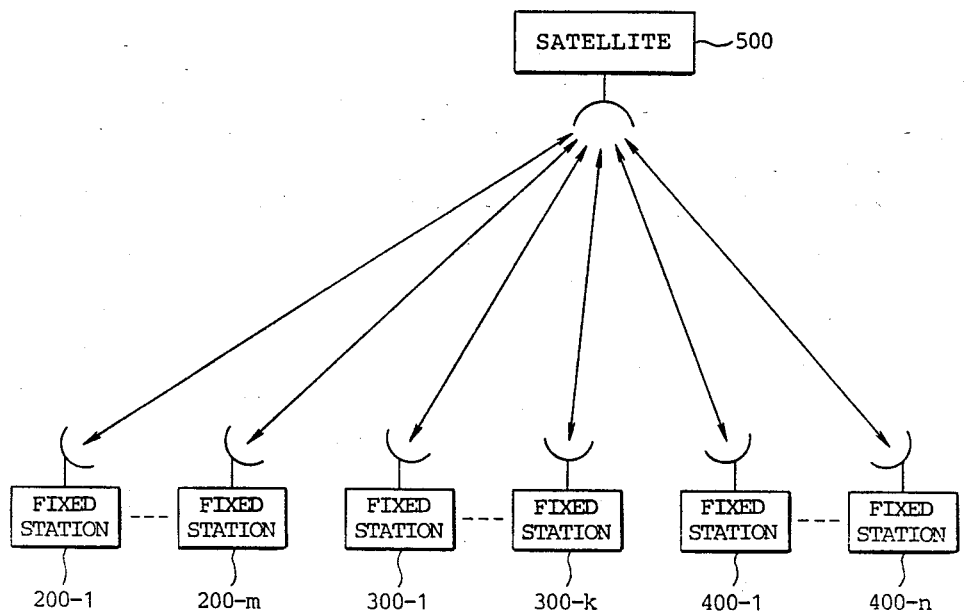
FIG. 12 schematically shows a satellite communication system according to another embodiment of this invention.

Referring to FIG. 12, a satellite communication system comprises first through m-th fixed stations 200-1 to 200-m, first through k-th fixed stations 300-1 to 300-k, and first through n-th fixed stations 400-1 to 400-n, in addition to a satellite 500.

Each of the fixed stations 200-1 to 200-m comprises an FDM unit and a demultiplexing unit which are similar in structure and operation to those of the base station 35 shown in FIG. 5. The FDM unit and the demultiplexing unit are connected to a transmitter-receiver (not shown) having a sharp directivity antenna directed to the satellite 500.

Each of the fixed stations 300-1 to 300-k comprises a spread spectrum processing unit and an inverse spread spectrum processing unit, like the base station 35 shown in FIG. 4. The spread spectrum processing unit and the inverse spread spectrum processing unit are connected to a transmitter-receiver having a sharp directivity antenna directed to the satellite 500.

Each of the fixed stations 400-1 to 400-n comprises an FDM unit, a demultiplexing unit, a spread spectrum processing unit, and an inverse spread spectrum processing unit and may be similar in structure and operation to those of the base station 35 shown in FIG. 5. A transmitter-receiver is connected to the FDM unit, the demultiplexing unit, the spread spectrum processing unit, and the inverse spread spectrum processing unit and has a sharp directivity antenna directed to the satellite 300.

In the satellite communication system, the fixed stations 200-1 to 200-m bidirectionally communicate with the fixed stations 400-1 to 400-n by sending FDM signals, respectively. On the other hand, the fixed stations 300-1 to 300-k bidirectionally communicate with the fixed stations 400-1 to 400-n by sending CDM signals, respectively.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. In an earth station for carrying out communication in a satellite communication system through a satellite by the use of an up-link frequency band and a down-link frequency band, said earth station comprising a transmission section responsive to first and second input signals for transmitting first and second transmission signals through said up-link frequency band towards said satellite, the improvement in combination with the foregoing wherein:

each of said up-link and said down-link frequency bands has a plurality of frequency subbands spaced apart from one another with frequency gap bands interposed between said frequency subbands;
said transmission section comprising:
modulating means for modulating a carrier by said first input signal to produce a transmission subband signal occupying a selected one of said frequency subbands of the up-link frequency band;
first transmitting means coupled to said modulating means for transmitting said transmission subband signal as said first transmission signal through said selected one of the frequency subbands;
spread spectrum processing means for processing said second input signal into a spread spectrum transmission signal having said up-link frequency band; and
second transmitting means coupled to said spread spectrum processing means for transmitting said spread spectrum transmission signal as said second transmission signal through said up-link frequency band.

2. An earth station as claimed in claim 1, said earth station comprising a reception section for receiving a first reception signal through a predetermined one of the frequency subbands of said down-link frequency band and a second reception signal through said down-link frequency band from said satellite to produce first and second output signals corresponding to said first and second input signals, respectively, wherein said reception section comprises:

first receiving means for receiving said first reception signal through said predetermined one of said frequency subbands of said down-link frequency band to produce a reception subband signal;
first producing means coupled to said first receiving means for producing said first output signal from said reception subband signal;
selecting means for selecting the frequency gap bands of said down-link frequency band to produce a frequency gap signal from said second reception signal; and
second producing means coupled to said second selecting means for producing said second output signal from said frequency gap signal.

3. An earth station as claimed in claim 2, said satellite communication system comprisng a base station, at least one fixed substation, and a movable station being capable of communicating with one another through said satellite by the use of said up-link frequency band and said down-link frequency band; said satellite communication system further comprising an additional satellite; said base station, said fixed substation, and said movable station being capable of communicating with one another through said additional satellite by the use of an additional up-link frequency band and an additional down-link frequency band; said earth station being operable as said base station, wherein said reception section further comprises:

second receiving means for receiving an additional reception signal through the frequency gap bands of said additional down-link frequency band of said additional satellite to produce an additional frequency gap signal;
third producing means coupled to said second receiving means for producing said second output signal from said additional frequency gap signal;
detecting means coupled to said second and third producing means for detecting a first arrival time instant of said reception signal and a second arrival time instant of said additional reception signal to produce first and second detection signals, respectively; and
calculating means responsive to said first and second detection signals for calculating the location of a selected one of said movable station.

4. An earth station as claimed in claim 2, wherein said first receiving means comprises selection means for selecting a predetermined one of said frequency subbands of said down-link frequency band to supply said reception subband signal.

5. An earth station as claimed in claim 2, wherein said selecting means comprises filter means for selecting said frequency gap bands of said down-link frequency band to supply said frequency gap signal 6. An earth station as claimed in claim 2, wherein said second producing means comprises delay means for delaying said frequency gap signal in a predetermined period to produce a plurality of delayed signals; adding means coupled to said delay means for adding said delayed signals to produce a sum signal; and a demodulator unit responsive to said sum signal for demodulating said sum signal to produce said second output signal.

7. An earth station as claimed in claim 6, wherein said demodulator unit comprises clock producing means responsive to said sum signal for producing a clock signal sequence; sampling means for sampling said sum signal by using said clock signal sequence to produce a sampled signal; and a demodulator responsive to said sampled signal for demodulating said sampled signal to produce said second output signal.

* * * * *